United States Patent
Miteva et al.

(10) Patent No.: US 8,434,939 B2
(45) Date of Patent: May 7, 2013

(54) TEMPERATURE AND TEMPERATURE DISTRIBUTION SENSING WITH HIGH RESOLUTION IN MICROSCOPIC ELECTRONIC DEVICES AND BIOLOGICAL OBJECTS

(75) Inventors: Tzenka Miteva, Stuttgart (DE); Gabriele Nelles, Stuttgart (DE); Akio Yasuda, Tokyo (JP)

(73) Assignee: Sony Deutschland GmbH, Berlin (DE)

( * ) Notice: Subject to any disclaimer, the term of this patent is extended or adjusted under 35 U.S.C. 154(b) by 855 days.

(21) Appl. No.: 12/519,462

(22) PCT Filed: Dec. 12, 2007

(86) PCT No.: PCT/EP2007/010894
§ 371 (c)(1),
(2), (4) Date: Sep. 14, 2009

(87) PCT Pub. No.: WO2008/077490
PCT Pub. Date: Jul. 3, 2008

(65) Prior Publication Data
US 2010/0008394 A1    Jan. 14, 2010

(30) Foreign Application Priority Data
Dec. 22, 2006 (EP) .................................. 06026681

(51) Int. Cl.
*G01K 11/20* (2006.01)
*G01K 15/00* (2006.01)

(52) U.S. Cl.
USPC ......... 374/137; 374/161; 374/1; 374/E11.024

(58) Field of Classification Search .............. 374/1, 137, 374/161, E3.001, E11.024, E15.001
See application file for complete search history.

(56) References Cited

U.S. PATENT DOCUMENTS

| 4,819,658 A | 4/1989 | Kolodner |
| 5,283,433 A | 2/1994 | Tsien |

(Continued)

FOREIGN PATENT DOCUMENTS

| EP | 1 391 708 | 2/2004 |
| JP | 60-250640 A | 12/1985 |

(Continued)

OTHER PUBLICATIONS

Kachynski, A.V. et al., "Three-Dimensional Confocal Thermal Imaging Using Anti-Stokes Luminescence", Applied Physics Letters, vol. 87, No. 2, pp. 023901-1-023091-3 (2005).

(Continued)

*Primary Examiner* — R. A. Smith
(74) *Attorney, Agent, or Firm* — Oblon, Spivak, McClelland, Maier & Neustadt, L.L.P.

(57) ABSTRACT

The present invention relates to a method of measuring a temperature and/or temperature distribution at a resolution <1 &mgr; m in an object and to a device for performing such method, more particularly to a microscope for performing such method. The method comprises applying a molecular thermometer embedded in a matrix layer on an object, photoexciting the said molecular thermometer with a light source of said microscope and measuring emission of radiation from said molecular thermometer with two photodetectors of said microscope. A first intensity at a first wavelength is measured by said first detector, a second intensity at a second wavelength is measured by said second.detector, and a ratio of said intensities is calculated and used to determine a temperature with a calibrated curve. Said microscope is a confocal microscope or a stimulated emission depletion (STED) microscope.

43 Claims, 3 Drawing Sheets

U.S. PATENT DOCUMENTS

| | | | |
|---|---|---|---|
| 5,653,539 A * | 8/1997 | Rosengaus | 374/159 |
| 6,004,530 A * | 12/1999 | Sagner et al. | 424/1.65 |
| 6,648,506 B2 | 11/2003 | McGrath et al. | |
| 7,326,365 B2 * | 2/2008 | Bawendi et al. | 252/301.4 R |
| 7,413,341 B1 * | 8/2008 | Kachynski et al. | 374/161 |
| 2002/0110180 A1 * | 8/2002 | Barney et al. | 374/161 |
| 2004/0032679 A1 | 2/2004 | Miteva et al. | |
| 2004/0150880 A1 * | 8/2004 | Nakata et al. | 359/386 |
| 2005/0048312 A1 * | 3/2005 | Herron et al. | 428/690 |
| 2005/0169348 A1 | 8/2005 | Chen et al. | |
| 2007/0025662 A1 | 2/2007 | Gugel | |
| 2007/0071064 A1 | 3/2007 | Miteva et al. | |
| 2009/0084959 A1 * | 4/2009 | Hudgings et al. | 250/341.8 |
| 2009/0251765 A1 * | 10/2009 | Miteva et al. | 359/326 |
| 2011/0013263 A1 * | 1/2011 | Miteva et al. | 359/326 |

FOREIGN PATENT DOCUMENTS

| | | |
|---|---|---|
| JP | H6-201999 A | 7/1994 |
| JP | 2004-077481 A | 3/2004 |
| WO | WO 0038283 A1 * | 6/2000 |
| WO | 2005 024482 | 3/2005 |

OTHER PUBLICATIONS

Japanese Office action mailed Feb. 22, 2013 in Japanese Patent Application No. JP 2009-541845.

* cited by examiner

Triplet-Triplet Annihilation: $T_1 + T_1 \rightarrow S_0 + S_1^* (S_n)$

TEMPERATURE AND TEMPERATURE DISTRIBUTION SENSING WITH HIGH RESOLUTION IN MICROSCOPIC ELECTRONIC DEVICES AND BIOLOGICAL OBJECTS

The present invention relates to a method of measuring a temperature and/or temperature distribution at a resolution <1 µm in an object and to a device for performing such method, more particularly to a microscope for performing such method.

The precision measurement and recording of high speed thermal transients on microscopic targets is critical, for example in the examination of biological objects or in the manufacturing of semiconductors and other electronic devices. The measurement of temperatures and/or temperature distributions in operating electronic devices is important in the thermal management of integrated circuits. More significantly even, such measurement should give information with respect to the understanding of the device physics which would then facilitate optimization processes. In the past there have been works on modeling as well as experimental registration of spatial and temporaral temperature distributions in operating devices, with the two optical registration approaches reported so far being infrared thermal microscopy and photo emission microscopy in combination with Raman microscopy (G. Albright, J. Stump, C. Li, Quantum Focus Ins. Corp. and H. Kaplan, Honeyhill Technical Company, Highlights, 2006; T. Fuyuki, K. Kitajima, H. Yano, T. Hatayama, Y. Uraoka, S. Hashimoto, Y. Morita, Thin Solid Films 487, 216-220, 2005; Y. Uraoka, K. Kitajima, H. Kirimura, H. Yano, T. Hatayama, T. Fuyuki, Japanese Journal of Applied Physics 44, 2895-2901, 2005; S. Inoue, M. Kimura, T. Shimoda, Japanese Journal of Applied Physics 42, 1168-1172, 2003; A. Sarua, H. Li, M. Kubal, M. J. Uren, T. Martin, K. P. Hilton, R. S. Balmer, C S Mantech, Apr. 24-27, 2006, Vancouver, British Columbia, Canada; J. W. Pomeroy, M. Kubal, M. J. Uren, K. P. Hilton, R. S. Balmer, T. Martin, Applied Physics Letters 88, 023507, 2006).

None of these reported methods are able to achieve a high physical spatial resolution in all three dimensions, i.e. in x, y and z directions, in combination with fast detection and high temperature resolution. Typically, resolutions achieved in the prior art in the x, y-plane in focus are in the range of 1-10 µm and in the z direction, i.e. along the light path the resolution for a given objective was twice the x-y resolution.

Accordingly, it was an object of the present invention to provide for a method and device for measuring a temperature and/or temperature distribution with a high spatial and temporal resolution. More specifically, it was an object of the present invention to provide for a method and device for measuring a temperature and/or temperature distribution having a x-y-resolution ≦300 nm and having a z-resolution in the range of from 10 to 40 nm.

All these objects are solved by a method of measuring a temperature and/or temperature distribution at a resolution <1 µm in an object, such as an electronic device or a biological object, said method comprising the steps:

a) providing an object,
b) applying a thermometer layer on said object or on a part of the surface of said object, where a temperature and/or temperature distribution is to be measured, said thermometer layer comprising a matrix and a molecular thermometer having temperature dependent emission characteristics, said molecular thermometer being embedded in said matrix, said thermometer layer having a thickness ≦40 µm, preferably in the range of from 10 nm to 40 nm,
c) providing a microscope having a light source, a first detector, a second detector, and a microscopy stage for receiving and scanning a sample to be examined,
d) placing said object on said microscopy stage and using said light source to photoexcite said molecular thermometer,
e) measuring emission of radiation from said photoexcited molecular thermometer by measuring a luminescence intensity ratio using said first and said second detector, wherein said luminescent intensity ratio is the ratio of luminescent intensity at a first and second wavelength, wherein said first and said second detector are used to measure a luminescence intensity at said first and second wavelength, respectively,
f) determining a temperature and/or temperature distribution based on said measured luminescence intensity ratio.

In one embodiment said microscope is a confocal microscope or a stimulated emission depletion (STED) microscope.

In one embodiment said molecular thermometer is selected from the group comprising metallo-porphyrins, other molecules having an inter-system crossing occur upon photoexcitation for >1% of the excited singlet state(s), preferably >50% of the excited singlet state(s), more preferably >90% of the excited singlet state(s) (e.g. Br-containing molecules), and metal-organic molecules having e.g. Ir, Pt, Ru, or Pd or others like Zn, Fe, Au, Ag, etc. in their structure and having an inter-system crossing occur upon photoexcitation for >1% of the excited singlet state(s), preferably >50% of the excited singlet state(s), and more preferably >90% of the excited singlet state(s).

Preferably, said molecular thermometer is a metallo-porphyrin, preferably selected from zinc octaethyl porphyrin (ZnOEP), palladium octaethyl porphyrin (PdOEP), and platinum octaethyl porphyrin (PtOEP).

In one embodiment said molecular thermometer is present in said thermometer layer at concentrations in the range of from 0.001 to 5 wt. %, preferably from 0.01 to 3 wt. %, referring to the total weight of said matrix.

In one embodiment said matrix is optically transparent.

In one embodiment said matrix is inert.

In a preferred embodiment said matrix is optically transparent and inert, wherein, preferably, said optically transparent and inert matrix is a polymeric matrix, and wherein, preferably, said polymeric matrix is made of a material selected from polystyrene, polymethylmethacrylate, polycarbonate, polysilicone, such as poly(dimethylsiloxane) (PDMS), polyolefine, e.g. polyethylene, polypropylene.

In one embodiment said matrix which may be a polymeric matrix or may be a non-polymeric matrix contains inorganic oxide or nitride.

In a preferred embodiment said polymeric matrix contains inorganic oxide or nitride.

In a preferred embodiment step b) is performed by a method selected from spin-coating, dipcoating, drop casting, doctor blading, Langmuir-Blodgett techniques, spraying, thermal evaporation, molecular beam deposition, lamination and adhering, e.g. gluing.

In a preferred embodiment said thermometer layer is a multilayer structure and comprises at least two sublayers, wherein each sublayer, preferably, has different concentrations of said molecular thermometer.

Preferably, no molecular heater layer is applied on said object to determine a temperature and/or temperature distribution in said object.

"A molecular heater", as used herein, is meant to encompass any elemental substance matter, chemical compound or mixture of chemical compounds and/or elemental substance matter that generates a large excess energy upon irradiation and absorption of electromagnetic radiation.

In a preferred embodiment in step d), said photoexcitation is performed by continuous excitation or pulsed excitation, wherein, preferably, said photoexcitation occurs in the wavelength range from 400-600 nm.

In a preferred embodiment the method according to the present invention further comprises a calibration step:
performing a calibration of said thermometer layer when applied to a substrate by
photoexciting said thermometer layer
measuring a luminescence intensity ratio from said thermometer layer at least two different temperatures
measuring said at least two different temperatures using an external means for measuring said temperatures, and
correlating each measured luminescence ratio with its corresponding temperature,
wherein said calibration step is performed prior to the step of photoexciting said molecular thermometer (step d), as recited above.

Preferably, said calibration step is performed independently of any of the steps recited above.

In a preferred embodiment luminescence intensity ratio is the ratio of a fluorescence intensity at said first wavelength, preferably including a delayed fluorescence intensity, such as e.g. delayed fluorescence that follows a triplet-triplet annihilation process, to a phosphorescence intensity at said second wavelength.

In a preferred embodiment said luminescence intensity ratio is the ratio of a fluorescence intensity of a singlet state of said molecular thermometer, optionally including a delayed fluorescence that follows a triplet-triplet annihilation process, at said first wavelength, to a phosphorescence intensity from an excited triplet state of said molecular thermometer at said second wavelength ($I_{singlet}/I_{triplet}$).

In a preferred embodiment said molecular thermometer is PdOEP and said luminescence intensity ratio is $I_{549nm}/I_{662nm}$.

In a preferred embodiment a resolution achieved is <500 nm, preferably <300 nm, more preferably <200 nm, even more preferably <100 nm in a plane perpendicular to the light beam of said microscope, and <500 nm, preferably <50 nm, more preferably <20 nm and most preferably approximately 10 nm in a direction along the light beam of said microscope.

The objects of the present invention are also solved by a microscope for performing the method according to the present invention, comprising
a light source, such as a laser, a laser diode, a light emitting diode,
a first detector and a second detector for measuring a luminescence intensity ratio, said luminescence originating from a molecular thermometer layer
a microscopy stage for receiving and scanning a sample to be examined
an object placed on said microscopy stage and having a thermometer layer applied thereon, said thermometer layer thus giving rise to luminescence when photoexcited by a light beam from said light source.

Preferably, the microscope according to the present invention is a confocal microscope or a stimulated emission depletion microscope (STED).

A "thermometer layer" as used herein is meant to refer to a layer which comprises a polymeric matrix and, embedded therein a molecular thermometer. A "molecular thermometer", as used herein is meant to refer to a molecular species or a combination of several molecular species together having temperature dependent emission characteristics. The term "molecular thermometer" is meant to encompass any elemental substance matter, chemical compound or mixture of chemical compounds and/or elemental substance matter whose fluorescence and/or phosphorescence emission intensity characteristics are temperature dependent. Preferably, a "molecular thermometer" has a lifetime (lifetimes) of its excited state (excited states) in the range of from ps to μs. Preferred embodiments of the molecular thermometer are dyes or combination of dyes selected from the group comprising metallo-porphyrins, also herein sometimes referred to as "metallated porphyrins", molecules having an inter-system crossing from a singlet to a triplet state occur upon photoexcitation for >1% of the excited singlet state(s), preferably >50%, more preferably >90%, and metal-organic molecules having Ir, Pt, Ru, or Pd or others like Zn, Fe, Au, Ag, etc. in their structure and having an inter-system crossing occur, upon photoexcitation for >1% of the excited singlet state(s), preferably >50%, and more preferably >90%. In general, as molecular thermometer any emissive dye with thermally activated band(s) or any combination of at least two emissive dyes can be used, whose intensity of luminescence varies with temperature.

Particularly preferred molecular thermometers are the metallated porphyrins (MOEP), wherein the metal is selected from Pt, Pd, Zn, Ir, and Ru, Fe, Mg, Co, Ni, etc. For these molecules the temperature dependent luminescence intensity ratio is the ratio of a fluorescence intensity from a singlet state of the porphyrin molecules, optionally including a delayed fluorescence that follows a triplet-triplet annihilation process, at said first wavelength, to a phosphorescence intensity from an excited triplet state of the porphyrin molecules at said second wavelength ($I_{singlet}/I_{triplet}$).

The matrix, in accordance with preferred embodiments of the present invention, into which the molecular thermometer is embedded, is optically transparent and/or inert, preferably optically transparent and inert. The term "optically transparent", when used herein in connection with a matrix, is meant to signify that such matrix is transparent in the wavelength range of the emission of the molecular thermometer embedded in such matrix. Preferably, the term "optically transparent", as used herein is meant to refer to transparency in the range of from 500 nm to 1500 nm. The term "inert", when used herein in connection with a matrix, is meant to signify that such matrix is chemically inert, i.e. it does not undergo chemical reactions. Preferably, such term is meant to refer to the fact that the matrix does not undergo chemical reactions with the molecular thermometer embedded in such matrix. Hence, preferably, the term "inert" is used synonymously herein with "chemically inert with respect to the molecular thermometer".

A "molecule having an inter-system crossing occur upon photoexcitation" is meant to refer to a molecule wherein, intramolecular radiationless transitions between states of different multiplicity occur which transitions are named inter-system crossing (ISC), in our case specifically S→Tn. In particular, upon photoexcitation, a transfer of excited electrons from a singlet state to a triplet state occurs. If in this context, reference is made to an amount in percentage at which such inter-system crossing occurs ("for >x % of the excited singlet state(s)"), this is meant to refer to the percentage of electrons in the singlet stage which undergo such intersystem crossing transfer. Hence, if the inter-system crossing (ISC) occurs at >1% of the excited singlet state(s), this means that >1% of all electrons in the excited singlet state(s) are crossing into the triplet state(s).

A "triplet-triplet annihilation process" as used herein, is meant to refer to a process in which two thermometer molecules both in a triplet state interact (usually upon collision) to produce one molecule in an excited singlet state and another molecule in its ground singlet state. This is often, but not always, followed by delayed fluorescence.

Hence, in preferred embodiments of the present invention, the luminescence intensity ratio is the ratio of a fluorescence intensity of a singlet state of said molecular thermometer, which may be a mixture of delayed fluorescence and prompt fluorescence, at said first wavelength, to a phosphorescence intensity from an excited triplet state of said molecular thermometer a said second wavelength. The fluorescence intensity may be a mixture of delayed fluorescence and prompt fluorescence. Preferably, the delayed fluorescence is a delayed fluorescence that follows a triplet-triplet-annihilation process. The term "prompt fluorescence", as used herein is a fluorescence that is not delayed.

If an intersystem crossing occurs for >50% of the excited singlet state Sn to the triplet state Tn, this ensures a highly populated triplet level Tn, the emission from which is detected as phosphorescence. As described above, a triplet-triplet annihilation process is followed by an internal up-conversion which may give rise to delayed fluorescence. In the notation of the present invention, the delayed fluorescence is occurring at a first wavelength, and the phosphorescence is occurring at a second wavelength, and their respective intensities are detected by a first and second detector, respectively.

In principle, the respective processes can be described with reference to FIG. 1, which shows the energy scheme and the molecular structure of palladium octaethylporphyrin (PdOEP) as an example of a molecular thermometer in accordance with the present invention. The principle is as follows: After absorption of a photon in the singlet band of the molecule, due to an effective inter-system crossing (ISC) (in this molecule >90%), strongly enhanced by spin-orbit coupling to the metal center of the molecule, the long-lived triplet state $T_1$ of the molecule is highly populated. This triplet state can be regarded as a reservoir of excited states for subsequent energy transfers. As a consequence of a triplet-triplet annihilation (TTA) process between the excited thermometer molecules themselves, one of the thermometer molecules returns to the ground state and the other is excited into a higher singlet state. The emissive relaxation to the ground state from the triplet state is the phosphorescence, whereas the emissive relaxation from the higher singlet state can be detected as delayed fluorescence.

The present inventors have surprisingly found that it is possible to apply a thermometer layer to an object and to study such object using high resolution microscopy techniques and thereby be able to measure the temperature and/or temperature distribution in or on this object with unprecedented high precision, high temporal and high spatial resolution. As opposed to previous methods, no separate molecular heater layer is required, and the method does not rely on Raman microscopy or infrared thermal microscopy. Preferred methods of microscopy to be used in conjunction with the present invention are confocal microscopy and stimulated emission depletion microscopy (STED).

In a typical STED microscope the excitation beam is overlapped with a doughnut-shaped beam that is capable of de-exciting fluorophores by stimulated emission. Co-alignment of the beam ensures that fluorescence is allowed only in the central area of the excitation spot where the doughnut beam is close to zero. Scanning with a narrowed spot across the sample readily yields subdiffraction images. With a sufficiently intense doughnut, the fluorescent spot of a STED microscope can, in principle, be sharpened down to the molecular scale (see for example Wilig et al., 2006, Nature Vol. 440, p. 935-939).

The principle of confocal microscopy can be explained by comparing it with conventional epifluorescence microscopy. In a conventional epifluorescence microscope, the shorter wavelength excitation light is reflected by a chromatic reflector through the objective and bathes the whole of the specimen in fairly uniform illumination. The chromatic reflector has the property of reflecting short wavelength light and transmitting longer wavelength light. Emitted fluorescent light (e.g. longer wavelength than the excitation light) passes from the specimen and passes straight through the chromatic reflector to the eyepiece.

In a confocal imaging system a single point of excitation light (or sometimes a group of points or a slit) is scanned across the specimen. The point is a diffraction limited spot on the specimen and is produced either by imaging an illuminated aperture situated in a conjugate focal plane to the specimen or, more usually, by focusing a parallel laser beam. With only a single point illuminated, the illumination intensity rapidly falls off above and below the plane of focus as the beam converges and diverges, thus reducing excitation of luminescence for interfering objects situated out of the focal plane being examined. Luminescence light (i.e. signal) passes back through the dichroic reflector (mirror) and then passes through a pinhole aperture situated in a conjugate focal plane to the specimen. Any light emanating from regions away from the vicinity of the illuminated point will be blocked by the aperture, thus providing yet further attenuation of out-of focus interference. The light passing through the image pinhole is detected by a photodetector. Usually a computer is used to control the sequential scanning of the sample and to assemble the image for display onto a video monitor. Most confocal microscopes are implemented as imaging systems that couple to a conventional microscope.

In summary, a confocal imaging system achieves out-of-focus rejection by two strategies: a) by illuminating a single point of the specimen at any one time with a focussed beam, so that illumination intensity drops off rapidly above and below the plane of focus and b) by the use of blocking a pinhole aperture in a conjugate focal plane to the specimen so that light emitted away from the point in the specimen being illuminated is blocked from reaching the detector. Confocal imaging can offer another advantage in favorable situations (small pinhole size, bright specimen): the resolution that is obtained can be better by a factor of up to 1.4 than the resolution obtained with the microscope operated conventionally.

A confocal microscope can be used in reflection mode and still exhibit the same out-of-focus rejection performance.

In preferred embodiments of the method and the microscope in accordance with the present invention, a laser is used as illumination source. Moreover, preferably optical sections of a sample may be obtained by scanning using a sample scanning stage. More preferably, such sample scanning stage is a piezo-driven stage. The stage is moved in a scanning pattern in the x-y-direction (x-y scanning) at micrometric distances. Furthermore, the addition of a z-motorization of the microscope stage allows to perform z-scanning and thus to obtain a series of optical sections of the sample. Moreover, preferably avalanche photodiodes are used as detectors. In order to ensure that each detector is specific for a specific wavelength, each detector has an interference filter for this specific wavelength to be detected by this particular detector. Alternatively, photomultipliers can be used instead of avalanche photodiodes as well.

In preferred embodiments of the method according to the present invention, the method comprises an additional calibration step wherein external means for measuring temperatures are used. Such external means for measuring temperatures are for example a thermocouple PT-100 (as described in NTB Sensordatenbank/Labor Elektronische Messsysteme; Sensor No. 03, Seiten 1-3; Baumgartner; commercially available e.g. from Endress+Hauser, Switzerland) fixed on top of the object covered with the thermometer layer. The object is then macroscopically heated. In one embodiment, during the calibration step, the respective luminescence intensity ratio is correlated with its corresponding temperature at which it has been measured. Such correlation may be represented as a plot of measured luminescence intensity ratio from the photoexcited molecular thermometer verses the measured temperature. It is clear for someone skilled in the art that from this operation a plot results which may be referred to as a "calibration curve". Likewise, the same information may be represented by an appropriate mathematical equation, for example in some cases by a linear equation of the form y=mx+b. In any case, it is clear to someone skilled in the art that the information obtained from such correlation allows the experimental to interpolate or extrapolate and to determine the temperature from any measured luminescence intensity ratio from the photoexcited molecular thermometer. Likewise, it is clear to someone skilled in the art that the data obtained may not necessarily have a linear relation ship, but for reasons of simplicity, this example has been given to illustrate the purpose of such correlation step.

By using a thermometer layer, in the absence of a specific heater layer, in combination with such high resolution microscopy techniques it is possible to obtain a spatial resolution in the x, y-plane which is only diffraction limited and may be as low as <200 nm, depending on the numerical aperture and the excitation light source wavelength. Furthermore, the resolution obtained in the z-direction purely depends on the thermometer layer thickness and is in the range of from 10 nm to 40 nm. Moreover, the sensitivity achieved by the present invention is 0.25 K or better, and the response times achieved are as short as 100 ns. Since the thermometer layer may be embedded in a multilayer structure, and since there may even be more than one thermometer layer placed at various depths within the object to be measured, also a three dimensional image and measurement of the temperature/temperature distribution can be obtained.

The method is independent from source intensity variation because luminescence intensity ratios are measured which makes the temperature measurement method according to the present invention quite robust.

In the following, reference is made to the figures, wherein.

Moreover, reference is made to the following examples which are given to illustrate, not to limit the present invention.

EXAMPLE 1

Thermometer Layer

In one embodiment, The active thermometer layer consists of metallated porphyrin molecules (MOEPs) dispersed in very low concentrations in inert matrix film (polystyrene, PS, or polymethylmethacrylate, PMMA, or others if appropriate). These molecules have strong temperature dependence of the delayed fluorescence which is based on their strongly temperature dependent triplet-triplet annihilation which leads to an internal up-conversion [S. Baluschev, F. Yu, T. Miteva, S. Ahl, A. Yasuda, G. Nelles, W. Knoll, G. Wegner, Nano Letters 5, 2482-2484, 2005; S. Baluschev, T. Miteva, V. Yakutkin, G. Nelles, A. Yasuda, G. Wegner, Physical Review Letters, man. LS10048, in print, 2006.] and have high luminescence efficiency at room temperature and high above it. Those are the two main features which make them a luminescent system suitable for in-situ real time temperature sensing in thin multilayer structures with the following characteristics:

ratiometric response—ensures independence on source intensity variations spatial resolution diffraction limited in x-y (we have at the moment 200 nm with NA 1 and 405 nm excitation source) and down to 10 nm in z (thermometer layer thickness sensitivity 0.25 K or better short response times—100 ns works as well in multilayer structures The present inventors used 10 to 40 nm thickness with concentrations of 0.1 to 3 wt % ZnOEP, PdOEP or PtOEP in PS or PMMA as thermometer layers, which were included in multilayered structures. As excitation source a 405 nm cw (continuous wave) or pulsed laser diodes have been used. The emission spectrum of a polymer blended MOEP has been integrated for a time domain, longer than the lifetime of its excited triplet state when using cw or high frequency pulses.

After the excitation of the MOEP molecules, the created singlets are transferred into triplet excitations via an intersystem crossing which is vastly increased due to the central metal atom influence. The energy scheme of the molecules is depicted in FIG. 1 together with the triplet-triplet annihilation process and the molecular structure of PdOEP as example. As a consequence of the involved ISC and TTA process, the emitted spectrum at RT, consists for Pd and PtOEP of strongly red shifted and efficient phosphorescence and very low green fluorescence.

Figure 1:
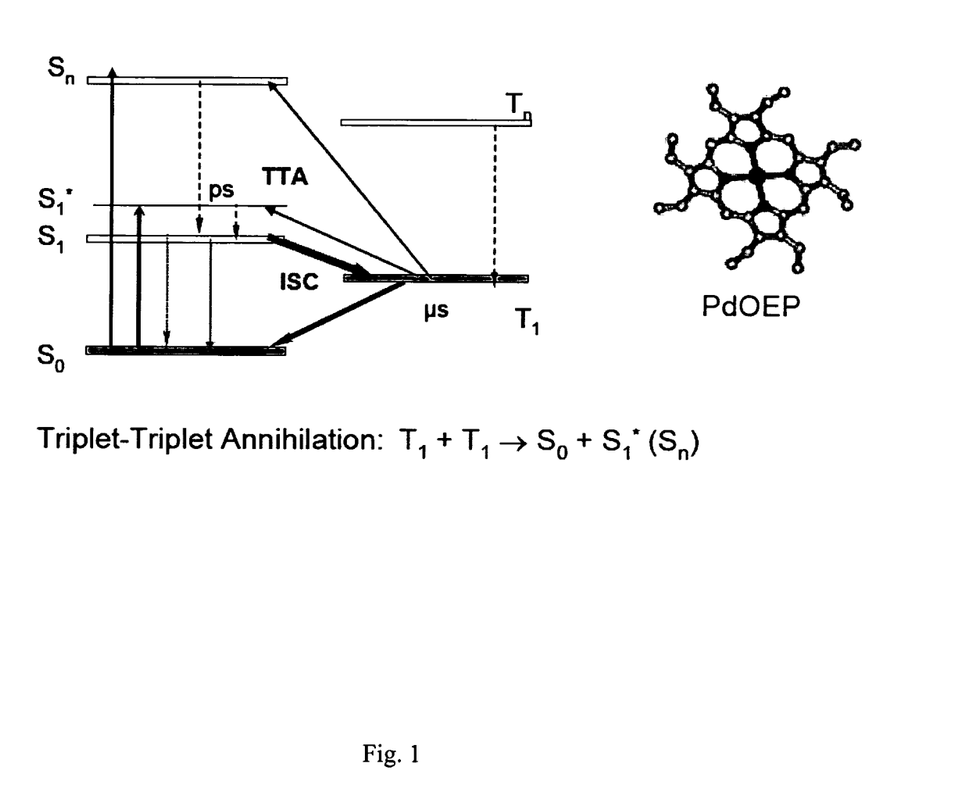
FIG. 1 shows the energy scheme and the molecular structure of palladium octaethylporphyrin (PdOEP) as an example of an active thermometer molecule.

FIG. 1. shows the energy scheme and the molecular structure of PdOEP as example of active thermometer molecule.

Figure 2:
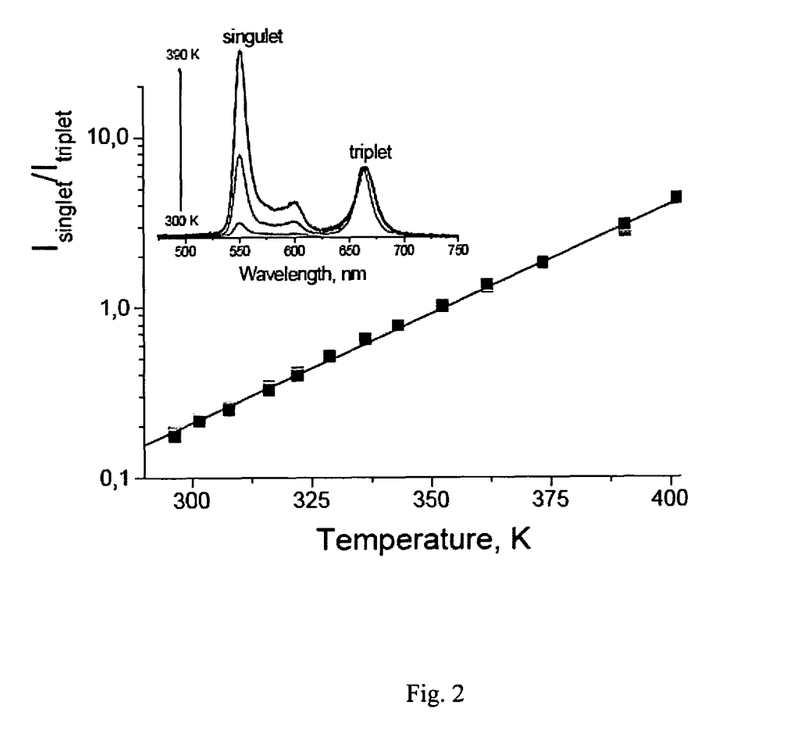
FIG. 2 shows the calibration curve for a thermometer layer comprising 1 wt. % PdOEP in a polystyrene matrix, with a film thickness of 40 nm and powers of excitation light between 0.8 and 10 mW; the inset shows emission spectra at different temperatures.

Increasing the temperature, a strong increase in the fluorescence emission has been observed (FIG. 2, inset). In the above described non-dynamical excitation regime, it has been possible to attribute to the singlet (DF)-triplet (phosphorescence) intensity ratio a temperature quantity in a linear manner.

In FIG. 2 a calibration curve for 20 ms integration time per point and for different excitation powers in 10 μm irradiated spot is shown. The thermometer macrocycle is PdOEP blended in PS layer with 40 nm thicknesses. For this calibration the sample was macroscopically heated and the surface (PS film) temperature was measured by a calibrated thermocouple The ratio between the measured intensity for the fluorescence $I_{singlet}$ (I 549), (see FIG. 2, inset) and the phosphorescence peak intensity $I_{triplet}$ ($I_{662}$) measured are shown for temperatures between 293 and 400 K.

FIG. 2. shows the calibration curve for the PdOEP blended with concentration 1 wt. % in polystyrene. Film thickness 40 nm. Powers between 0.8 and 10 mW. For further details see text. Inset: Emission spectra at different temperatures.

For a given intensity of the probing laser, sample structure (thickness, macrocycle and its concentration) and integration time there is a very well reproducible exponential dependence of the ratio $I_{singlet}/I_{triplet}$. For the given concentration of 1 wt % of the thermometer molecules and 20 ms integration time the ratio does not depend on the probing laser power for the investigated temperature intervals. The accuracy is 0.1-0.25 K depending on the macrocycle.

EXAMPLE 2

Figure 3:
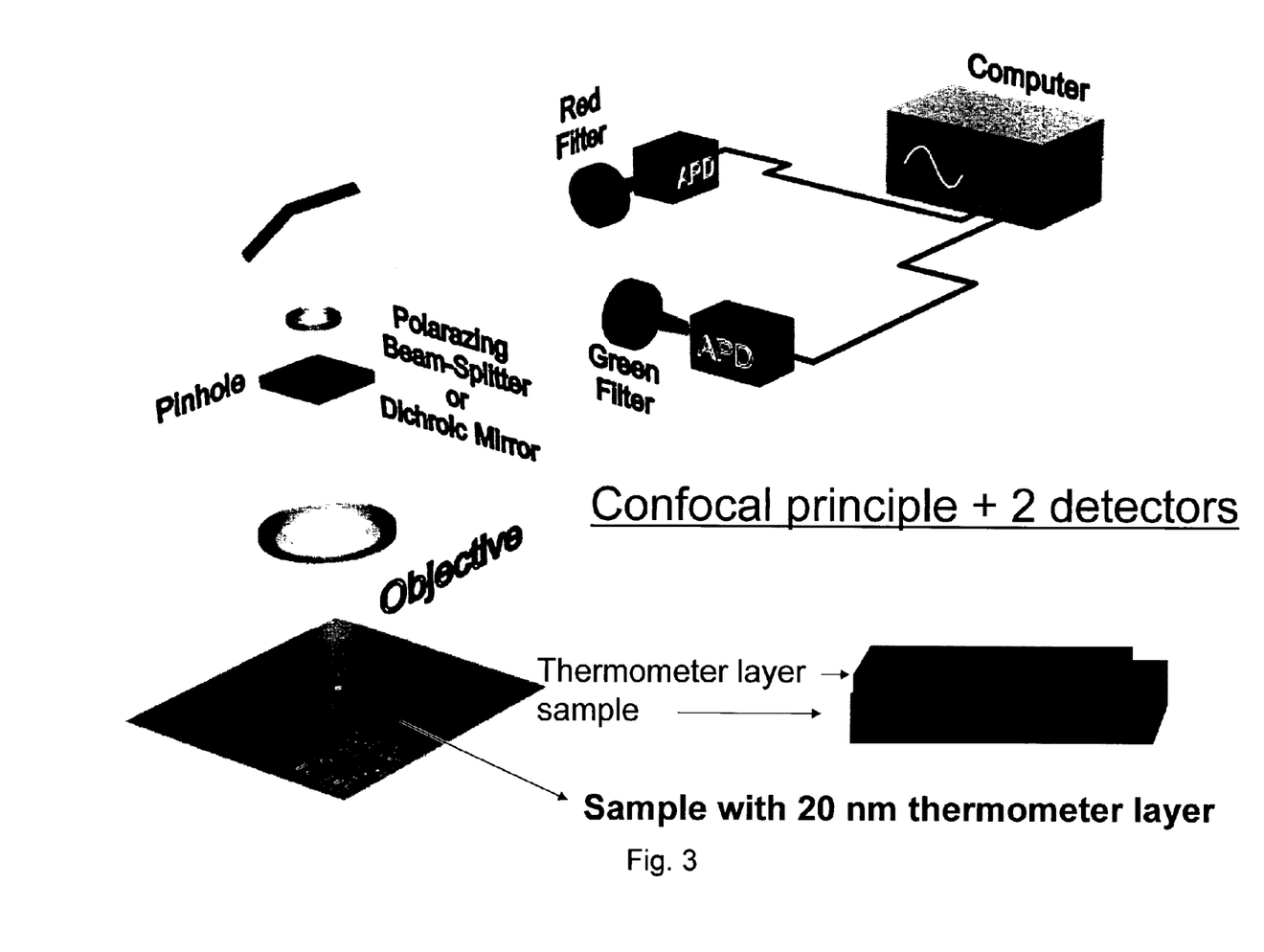
FIG. 3 shows a schematic setup of a confocal microscope device in accordance with the present invention having two detectors to measure luminescence intensity ratios in accordance with the present invention.

FIG. 3 shows a schematic diagram of an embodiment of a confocal microscope set-up according to the present invention, wherein the sample is an object whose temperature or temperature distribution should be measured and upon which a thermometer layer has been applied. It is important to note that the confocal device has two detectors to detect luminescence intensity ratios.

Each of the detectors has an interference filter to selectively detect a specific wavelength. Furthermore, the device has a sample scanning stage which, preferably is a piezo-driven stage with high frequency, as opposed to most commercially available fluorescence confocal microscopes, such as Leika, Zeiss, Olympus), a high numerical non-immersion or immersion-objective lends, a notch or edge cut-off filter to cut off the excitation wavelength at the entrance of a detection unit, the detection unit having a dichroic beam splitter (dichroic mirror) corresponding to the wavelengths that are to be detected by the two detectors) and two detectors (preferably avalanche photodiodes), each detector having an interference filter to let only the desired wavelength or wavelength range to be passed through (e.g. one green and one red, such as 549 nm and 662 nm, respectively), a computer for controlling the scanning stage (optionally scanning stages), the light source, and the detection unit, having software to control and collect the data from the detectors. The light source may for example be a laser, a laser diode or a light emitting diode, without being limited thereto.

The features of the present invention disclosed in the specification, the claims and/or in the accompanying drawings, may, both separately, and in any combination thereof, be material for realising the invention in various forms thereof.

The invention claimed is:

1. A method of measuring a temperature and/or temperature distribution at a resolution <1 μm in an object, such as an electronic device or a biological object, said method comprising:
    a) providing an object,
    b) applying a thermometer layer on said object or on a part of the surface of said object where a temperature and/or temperature distribution is to be measured, said thermometer layer comprising a matrix and a molecular thermometer having temperature dependent emission characteristics, said molecular thermometer being embedded in said matrix, said thermometer layer having a thickness in a range from 10 nm to 40 nm,
    c) providing a microscope having a light source, a first detector, a second detector, and a microscopy stage for receiving and scanning a sample to be examined,
    d) placing said object on said microscopy stage and using said light source to photoexcite said molecular thermometer,
    e) measuring emission of radiation from said photoexcited molecular thermometer by measuring a luminescence intensity ratio using said first and said second detector, wherein said luminescent intensity ratio is the ratio of luminescent intensity at a first and second wave-length, wherein said first and said second detectors are used to measure a luminescence intensity at said first and second wavelengths, respectively, and
    f) determining a temperature and/or temperature distribution based on said measured luminescence intensity ratio.

2. The method according to claim 1, wherein said microscope is a confocal microscope or a stimulated emission depletion (STED) microscope.

3. The method according to claim 1, wherein said molecular thermometer is selected from the group comprising metallo-porphyrins, other molecules having an inter-system crossing occur upon photoexcitation for >1% of the excited singlet state(s), and metal-organic molecules having an inter-system crossing occur upon photoexcitation for >1% of the excited singlet state(s).

4. The method according to claim 3, wherein said molecular thermometer is a metallo-porphyrin.

5. The method according to claim 4, wherein said metallo-porphyrin is selected from the group comprising zinc octaethyl porphyrin (ZnOEP), palladium octaethyl porphyrin (PdOEP), and platinum octaethyl porphyrin (PtOEP).

6. The method according to claim 3, wherein said other molecules have an inter-system crossing occur upon photoexcitation for >50% of the excited singlet state(s).

7. The method according to claim 3, wherein said other molecules have an inter-system crossing occur upon photoexcitation for >90% of the excited singlet state(s).

8. The method according to claim 3, wherein said metal-organic molecules have at least one of Ir, Pt, Ru, Pd, Zn, Fe, Au or Ag in a structure thereof.

9. The method according to claim 3, wherein said metal-organic molecules have an inter-system crossing occur upon photoexcitation for >50% of the excited singlet state(s).

10. The method according to claim 3, wherein said metal-organic molecules have an inter-system crossing occur upon photoexcitation for >90% of the excited singlet state(s).

11. The method according to claim 1, wherein said molecular thermometer is present in said thermometer layer at concentrations in a range from 0.001 to 5 wt. % referring to the total weight of said matrix.

12. The method according to claim 11, wherein said molecular thermometer is present in said thermometer layer at concentrations in a range from 0.01 to 3 wt. % referring to the total weight of said matrix.

13. The method according to claim 1, wherein said matrix is optically transparent.

14. The method according to claim 1, wherein said matrix is inert.

15. The method according to claim 1, wherein said matrix is optically transparent and inert.

16. The method according claim 15, wherein said optically transparent and inert matrix is a polymeric matrix.

17. The method according to claim 16, wherein said polymeric matrix is made of a material selected from the group comprising polystyrene, polymethylmethacrylate, polycarbonate, polysilicone, and polyolefine.

18. The method according to claim 17, wherein said polysilicone is poly(dimethylsiloxane) (PDMS), and said polyolefine is polyethylene or polypropylene.

19. The method according to claim 16, wherein said matrix contains inorganic oxide or nitride.

20. The method according to claim 1, wherein said matrix contains inorganic oxide or nitride.

21. The method according to claim 1, wherein the applying b) is performed by a method selected from the group comprising spin-coating, dip-coating, drop casting, doctor blading, Langmuir-Blodgett techniques, spraying, thermal evaporation, molecular beam deposition, lamination and adhering.

22. The method according to claim 1, wherein said thermometer layer is a multilayer structure and comprises at least two sublayers.

23. The method according to claim 22, wherein each sublayer has a different concentration of said molecular thermometer.

24. The method according to claim 1, wherein no molecular heater layer is applied on said object to determine a temperature and/or temperature distribution in said object.

25. The method according to claim 1, wherein, in the placing d), said photo-excitation is performed by continuous excitation or pulsed excitation.

26. The method according to claim 25, wherein said photoexcitation occurs in the wavelength range of 400-600 nm.

27. The method according to claim 1, further comprising a calibration step:
performing a calibration of said thermometer layer when applied to a substrate by
photoexciting said thermometer layer,
measuring a luminescence intensity ratio from said thermometer layer at at least two different temperatures,
measuring said at least two different temperatures using an external means for measuring said temperatures, and
correlating each measured luminescence ratio with its corresponding temperature,
wherein said calibration step is performed prior to the placing d) of photoexciting said molecular thermometer.

28. The method according to claim 1, further comprising a calibration step: performing a calibration of said thermometer layer when applied to a substrate by
photoexciting said thermometer layer,
measuring a luminescence intensity ratio from said thermometer layer at at least two different temperatures,
measuring said at least two different temperatures using an external means for measuring said temperatures, and
correlating each measured luminescence ratio with its corresponding temperature,
wherein said calibration step is performed independently of any of the steps a)-f).

29. The method according to claim 1, wherein said luminescence intensity ratio is the ratio of a fluorescence intensity at said first wavelength to a phosphorescence intensity at said second wavelength.

30. The method according to claim 29, wherein said fluorescence intensity at said first wavelength includes a delayed fluorescence intensity.

31. The method according to claim 1, wherein said luminescence intensity ratio is the ratio of a fluorescence intensity of a singlet state of said molecular thermometer to a phosphorescence intensity from an excited triplet state of said molecular thermometer at said second wavelength ($I_{singlet}/I_{triplet}$).

32. The method according to claim 31, wherein said fluorescence intensity of said singlet state of said molecular thermometer includes a delayed fluorescence that follows a triplet-triplet-annihilation process at said first wavelength.

33. The method according to claim 1, wherein said molecular thermometer is PdOEP and said luminescence intensity ratio is $I_{549nm}/I_{662nm}$.

34. The method according to claim 1, wherein the resolution achieved is <500 nm in a plane perpendicular to a light beam of said microscope, and <500 nm in a direction along the light beam of said microscope.

35. The method according to claim 34, wherein the resolution achieved is <300 nm in a plane perpendicular to the light beam of said microscope.

36. The method according to claim 34, wherein the resolution achieved is <200 nm in a plane perpendicular to the light beam of said microscope.

37. The method according to claim 34, wherein the resolution achieved is <100 nm in a plane perpendicular to the light beam of said microscope.

38. The method according to claim 34, wherein the resolution achieved is <50 nm in a direction along the light beam of said microscope.

39. The method according to claim 34, wherein the resolution achieved is <20 nm in a direction along the light beam of said microscope.

40. The method according to claim 34, wherein the resolution achieved is approximately 10 nm in a direction along the light beam of said microscope.

41. A microscope for performing the method according to claim 1, comprising:
said light source,
said first detector and said second detector that measures said luminescence intensity ratio, said luminescence originating from said molecular thermometer layer,
said microscopy stage that receives and scans said sample to be examined,
wherein said object having said thermometer layer applied thereon is placed on said microscopy stage and said thermometer layer gives rise to luminescence when photoexcited by a light beam from said light source.

42. The microscope according to claim 41, wherein the microscope is a confocal microscope or a stimulated emission depletion microscope (STED).

43. The microscope according to claim 41, wherein the light source is a laser, a laser diode, or a light emitting diode.

* * * * *